United States Patent
Baskerville et al.

(10) Patent No.: US 8,910,237 B2
(45) Date of Patent: Dec. 9, 2014

(54) TRUSTED QUERY NETWORK SYSTEMS AND METHODS

(75) Inventors: Richard Baskerville, Decatur, GA (US); Art Vandenberg, Atlanta, GA (US); Daniele Bertolotti, Desenzano del Garda (IT); Saravanaraj Duraisamy, Atlanta, GA (US)

(73) Assignee: Georgia State University Research Foundation, Inc., Atlanta, GA (US)

( * ) Notice: Subject to any disclaimer, the term of this patent is extended or adjusted under 35 U.S.C. 154(b) by 0 days.

(21) Appl. No.: 13/384,065

(22) PCT Filed: Jul. 16, 2010

(86) PCT No.: PCT/US2010/042256
§ 371 (c)(1),
(2), (4) Date: Mar. 30, 2012

(87) PCT Pub. No.: WO2011/009041
PCT Pub. Date: Jan. 20, 2011

(65) Prior Publication Data
US 2012/0180106 A1   Jul. 12, 2012

Related U.S. Application Data

(60) Provisional application No. 61/226,080, filed on Jul. 16, 2009, provisional application No. 61/265,416, filed on Dec. 1, 2009.

(51) Int. Cl.
*H04L 29/06* (2006.01)
*H04L 12/64* (2006.01)
*H04L 9/32* (2006.01)

(52) U.S. Cl.
CPC .......... *H04L 12/6418* (2013.01); *H04L 9/3247* (2013.01); *H04L 9/3263* (2013.01); *H04L 2209/16* (2013.01); *H04L 2209/42* (2013.01)
USPC ......... 726/1; 726/2; 726/3; 713/153; 713/155

(58) Field of Classification Search
CPC .............. H04L 9/3263; H04L 2209/16; H04L 2209/42
USPC ........................... 726/1–3; 713/153, 155, 160
See application file for complete search history.

(56) References Cited

U.S. PATENT DOCUMENTS

| | | |
|---|---|---|
| 2005/0203999 A1 | 9/2005 | Muguda et al. |
| 2008/0133531 A1 | 6/2008 | Baskerville et al. |
| 2011/0314281 A1* | 12/2011 | Fielder .......................... 713/168 |

FOREIGN PATENT DOCUMENTS

KR   10-2002-0096728 A   12/2002

OTHER PUBLICATIONS

U.S. Appl. No. 61/163,417, filed Mar. 2009, Fielder et al.*
International Search Report and Written Opinion dated Feb. 24, 2011.
Supplemental European Search Report and dated Feb. 7, 2013.

* cited by examiner

*Primary Examiner* — Justin T Darrow
(74) *Attorney, Agent, or Firm* — Thomas | Horstemeyer, LLP

(57) ABSTRACT

Systems and methods are disclosed with which queries can be sent to various clients of a trusted query network in a trusted query network message. In one embodiment, each registered client receives the message and determines whether or not it will participate in the query. If so, the client adds to the message in a first data round a true response to the query and obfuscation data, and then forwards the message on to the next client (or back to the client that initiated the query if each client has added its data to the message). In a second round, the message is again sent to each participating client, which this time removes its obfuscation data. Once each client has removed its obfuscation data, a final result is obtained that can be sent to each of the clients.

28 Claims, 14 Drawing Sheets

Data Round 1
(Obfuscation Round)

Policy Evaluation Round 3

Policy Evaluation Round 4

TRUSTED QUERY NETWORK SYSTEMS AND METHODS

CROSS-REFERENCE TO RELATED APPLICATION

This application is the 35 U.S.C. §371 national stage of PCT application PCT/US2010/042256, filed Jul. 16, 2010, which claims priority to and the benefit of U.S. Provisional Application No. 61/226,080, filing date Jul. 16, 2009 and U.S. Provisional Application No. 61/265,416, filing date Dec. 1, 2009, both of which are hereby incorporated by reference in their entirety.

BACKGROUND

Risk management is the ensemble of processes of identifying, assessing, and taking steps to mitigate risks. Risk management pervades decision-making in all areas of both industry and private life: from a company securing a factory against thefts, to each of us when we decide to install a home security system. All of these decisions are the result of risk management activities in which assets are considered and decisions are taken according to possible losses. As a process, risk management typically comprises several phases, including risk analysis, risk mitigation, and risk evaluation and assessment.

Risk analysis is the foundation of the risk management process and is therefore critical to effectively managing risk. Not only does risk analysis drive the decision-making process, but it also provides the fundamental justification required by senior management and the stakeholder in determining the safeguards to be implemented in an organization. When risk analysis is performed, accuracy is vital: only through an accurate risk analysis can the risk management process provide meaningful results. Central to the accuracy of the risk analysis is the collected data upon which the analysis is based. Unfortunately, such data is often difficult to obtain. For example, when the risk analysis concerns an organization's information security, problems include: (i) the lack of reliable empirical data about the frequency and amount of losses attributable to information security compromises, and (ii) the relative rarity of many kinds of information security compromises.

The first problem (i.e., lack of reliable data) represents a great limit to the accurate calculation of risk analysis profiles. Most organizations are not prepared to collect this kind of data when a loss happens, or the data is collected in an incorrect or ineffective way. Collecting data is a complex operation that requires organizations to analyze the situation and focus on the aspects of the loss that are relevant and meaningful. Usually, this effort is required immediately after a vulnerability has been exercised, which is also the time at which most of the resources of the organization are directed to the recovery from the compromise rather than evaluating the costs of the compromise and analyzing how it could have happened. Another factor that contributes to the lack of reliable empirical data is the fact that organizations that possess this kind of data are normally unwilling to release it due to the extreme sensitivity of its nature: the disclosure could mean immediate losses for the organization, both economical and reputational.

The second problem (i.e., rarity of data) is related to the fact that many compromises are simply rare and it is not reasonable to assume that the organization has experienced them. The rarity makes these events hard to measure and quantify. While mathematical approaches are the best to establish the probability of randomly distributed events (such as virus infection), they fail when it comes to more unique compromises (such as insider crimes).

The two problems discussed above can, to at least some degree, be overcome by the use of collaborative approaches between organizations operating in the same industry. A collaborative approach in which organizations share their knowledge about risks, vulnerabilities, and losses could provide the required consistency to the collected data, both in terms of empirical data availability and accuracy. Unfortunately, there are significant obstacles to such collaboration, including the availability, sensitivity, and relevancy of the data to be shared. In terms of data availability, it is common for large organizations to not collect data related to the exercise of IT security vulnerabilities. Such data collection may not be performed because it is often difficult to define the kind of data that is to be collected.

With regard to data sensitivity, data related to IT security losses, breaches, and exploited vulnerabilities is nearly always sensitive and confidential. When inadequate security practices result in a loss for the organization, management is often concerned that the disclosure of such losses will undermine the public confidence in the organization. It is not only a matter of embarrassment but also a matter of credibility and trust that the public market is willing to show to the organization. In view of this, sensitive data can typically only be collected when one can guarantee to the organization providing the data that the data will not be disclosed in any way. This requires complete trust in the collecting agency and its intentions with the data.

Regarding data relevancy, it is important to have the right data at the right moment. Organizations that decide to collaborate have to define together on which data and which aspects they are going to focus their collaboration. As the number of participant organizations grows, it becomes more difficult to unify the collaborative efforts due to different needs that might arise. For example, some organizations may want to not participate in certain collaborative tasks or questions.

In view of the above discussion, it can be appreciated that it would be desirable to have systems and methods that facilitate and encourage the sharing of sensitive information between organizations to assist those organizations in managing risk.

BRIEF DESCRIPTION OF THE DRAWINGS

The disclosed systems and methods can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
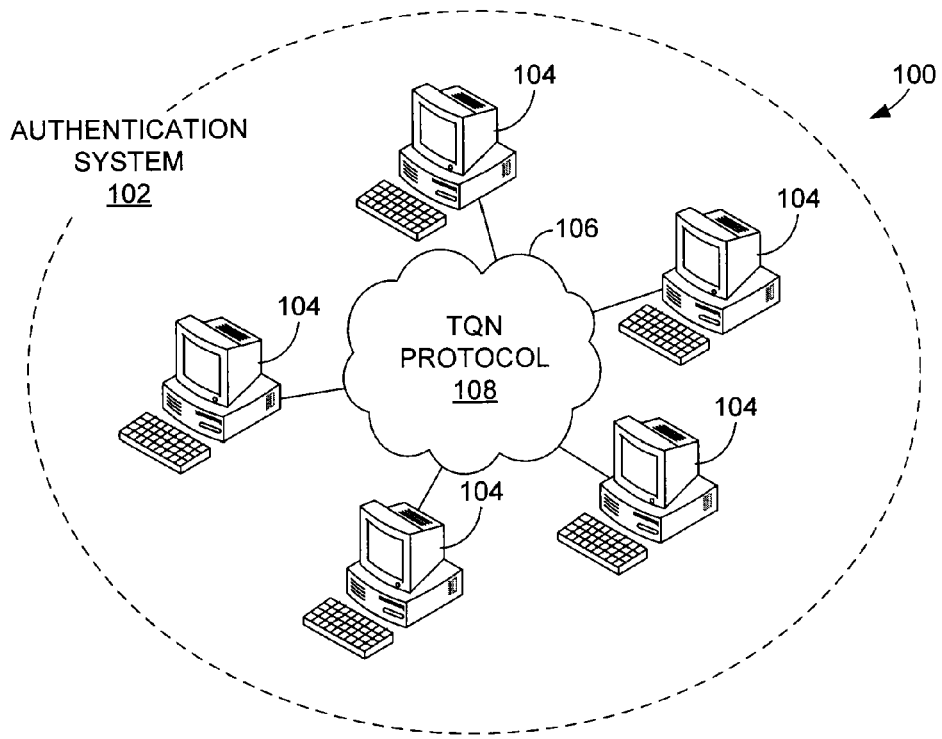
FIG. 1 is a schematic diagram that illustrates an embodiment of a trusted query network (TQN) architecture.

As described above, it would be desirable to have systems and methods that facilitate and encourage the sharing of sensitive information between organizations to assist those organizations in managing risk. Disclosed herein are trusted query networks (TQNs) that provide such functionality. Although specific embodiments are discussed, it is to be understood that those embodiments are mere example implementations and that other embodiments are possible. The present disclosure is intended to extend to and include all such embodiments.

Trusted Query Network Principles

The various terms in the name "trusted query network" describe various attributes of the system. "Network" is suggestive of a group of entities that come together to create a collaborative environment in which information can be shared. "Query" describes how the entities participating in the network access the information. As described below, whenever a participant wishes to access the shared information, the participant can generate a query (i.e., question) that propagates to all the other participants. "Trusted" is indicative of the trust each participant has in the system, that trust being critical to the free exchange of information between the participants. As described below, the TQN guarantees certain levels of trust. For example, the TQN assures that each participant is authorized to participate and that no personal data is ever disclosed or can be directly associated with or attributed to any specific participant. Those aspects of the TQN are believed to be enough to induce trust in the other participants' rights and trust in the network itself.

The principles upon which the disclosed TQNs are based include anonymity, aggregated data, distributed coordination, network security, optional participation, trust, automated operability, distributed aggregation, and scalability. Each of those principles is briefly discussed in the following paragraphs.

Anonymity is a key principle for a sound solution. In at least some embodiments, every participant is granted total anonymity, meaning that in no situation is their identity revealed on the network. Indeed, even the network is unaware of the identity of the individual participants. To accomplish this, some form of authentication in which the authenticating authority is separated from the network can be used. In such a situation, the only thing the network will know about each participant is whether or not the participant has the required level of access to take part in the TQN. To that end, the TQN can comprise a trusted federated identity management infrastructure to which authentication is delegated. Furthermore, data anonymity is provided: no data can be associated with any participant, even if the participant is anonymous.

In the TQN, personal or organizational private data should never be disclosed in the network at any moment. Along the same vein, no centralized collector can possess any form of personal data belonging to participants. In at least some embodiments, private data is present only locally at each organization's site and nowhere else in the network. As described below, an obfuscation protocol can be used to protect such data and the TQN can be configured to only disclose aggregated data for each query.

Given that it can be assumed that organizations do not trust centralized data collectors with their private data, it can further be assumed that such organizations would not trust a centralized coordinator running the process of collecting the data. To account for such lack of trust, the data collection protocol used in the TQN can be distributed, meaning that every participant plays a part in the coordination process. In this way, the protocol itself can be trusted because it will be the result of several small traceable actions (assuring that each participant has control over its own data and actions and that no other participant, or the coordinator, can comprise its data or actions), as opposed a central coordinator's decisions.

To inspire confidence, it is important for the network to be secure so that it provides advanced systems of cryptography and attack resistance. In at least some embodiments, the TQN incorporates security that ensures that the information exchanged over the network cannot be compromised.

In at least some embodiments, each participant has the opportunity to withdraw from participation to certain queries. In such a case, each participant is able to define, through the use of policies, under what circumstances the participant will, or will not, contribute its private data. The inclusion of such a principle is a further measure to provide incentive to participate as it is reasonable to assume that not every participant is comfortable responding to every query.

Trust is one of the most sensitive issues when it comes to information sharing. It is desirable to be able to guarantee that each of the participants is authorized to take part in the network so the legitimacy of other participants can be trusted. Furthermore, it is desirable to be able to guarantee that the principles of anonymity, no private data disclosure, secure network, and distributed coordination are granted. This can be achieved through the use of sound protocols and architectures.

A further level of trust, which may be called business trust, is also important. The term business trust refers to the trust that no information sharing solution can guarantee: the trust that all of the participants will provide the true information to which a query pertains. This principle can be addressed by, for example, requiring that the participants contract to sharing their true information. Further, this principle of business trust is supported by TQN's guarantee of anonymity, no private data disclosure, secure network and distributed coordination, such that responding to a query with true private information will carry no risk.

To guarantee the requirement of updated and timely responses, the operations at each participant's site can be automated, meaning that the TQN does not need, once each participant has established its policy, human intervention to carry out successfully a query.

TQNs operate on a principle of distributed aggregation. The private data of an individual participant does not travel through a TQN. Only aggregates of this data are permitted to travel through a TQN. These aggregates are composed of data from multiple participants and constructed such that it is impractical to extract any individual participant's data from the aggregate alone. At certain times, the TQN can enable a participant to incorporate randomly generated data that is aggregated with their actual participant private data to ensure that only aggregate data travels through a TQN.

The distributed aggregation principle means that the TQN operates by distributing the activity of calculation and compilation of the aggregations to the individual participants. Each participant calculates and compiles its own private data into the aggregated values, and only the aggregated values are shared. Because the process of calculating and compiling the aggregates is performed by each individual participant, it becomes unnecessary for participants to disclose their actual, individual private data to any other participant in the TQN. Private individual data is stored only in the individual participant's own systems and is used for calculation or compilation processes only in the individual participant's own systems. Because TQN does not require the individual participant's private data to move outside of the individual participant's own individual systems, the risk of accidental or intentional disclosure of this data within TQN is greatly reduced.

It is also important for the TQN to be expandable to new participants with ease. While a federated identity management solution can be used to authenticate participants, a peer-to-peer (P2P) network architecture can facilitate scalability.

TQN Architecture and Protocol

The definition and basic principles of the TQN having been provided above, example architectures for the TQN and the TQN protocol will now be described. FIG. 1 illustrates one example TQN architecture. As shown in FIG. 1, a TQN 100 includes an authentication system 102, multiple TQN clients 104 (also referred to herein as "nodes"), a TQN network 106, and a TQN protocol 108 that is practiced over the network. The role of the authentication system 102 is to grant the authorized participants access to the network 106 without leaking any personal information, thus ensuring anonymity. In such a case, the network 106 will only know that the participant has the right to participate.

Each participant runs a TQN client 104 that represents the interface with the network 106. Through use of the TQN client 104, participants are able to create queries and retrieve query results. Because the TQN's coordination is distributed, each client 104 is capable of performing all of the steps required by the TQN protocol 108. In some embodiments, each TQN client 104 has a secure local data store where its private data is stored.

The TQN network 106 is the medium through which the clients 104 communicate and the TQN protocol 108 collects information from each participant. Preferably, the network 106 is configured to support the principles of both scalability and security.

In some embodiments, the TQN clients 104 cooperate to run the TQN protocol 108 over the network 106. This protocol 108 implements the core activities of the TQN 100. Therefore, the protocol 108 enables each TQN client 104 to formulate queries and collect the results of those queries from all participants. The protocol further suppresses private data through proper obfuscation and aggregation of data, and assures correct implementation of the opted participation.

In some embodiments, the TQN has a centralized P2P network structure in which the TQN clients communicate with each other by routing messages through a centralized component, referred to herein as the TQN message broker. The centralized P2P configuration provides an acceptable level of scalability and, even more important, provides anonymity: using a neutral centralized message broker helps conceal the physical locations of the different participants from each other. Since the TQN message broker is the centralized element of the network architecture, the authentication system protects the TQN message broker's services, allowing only authenticated nodes to use them. The TQN message broker enables the communication between TQN clients in a transparent way. In some embodiments, the TQN clients send messages to each other using identifiers randomly assigned by the TQN message broker. The messages are then encrypted in a way that only the recipient of the message is actually able to read its contents. Details of an example architecture are described below in relation to FIG. 2.

Figure 2:
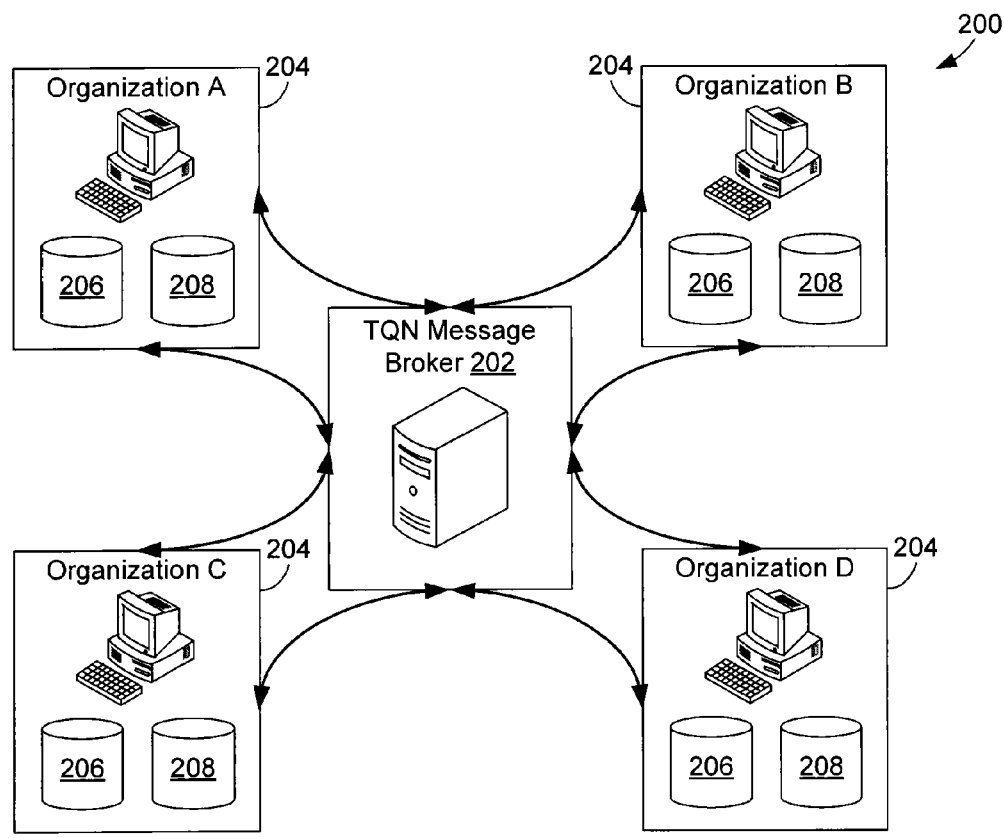
FIG. 2 is a schematic diagram that illustrates a further embodiment of a TQN architecture.

FIG. 2 illustrates the architecture of a TQN 200 that includes a TQN message broker 202 and multiple TQN clients 204, each associated with a different organization. An authentication system (not shown) controls the authentication required to access the TQN message broker's services. As indicated in FIG. 2, each TQN client 204 includes a policy store 206, which stores the policies defining the opted participation to the queries, and a data store 208, which stores the private data that is to be used to answer queries.

Authentication System

As mentioned above, authentication is performed using an authentication system. In one embodiment, the authentication system comprises the Shibboleth® system, which is a standards-based, open source software package that enables sites to make authorization decisions for individual access of protected online resources in a privacy-preserving manner. As is known in the art, Shibboleth® uses a service provider (SP) and an identity provider (IdP). The SP can be used to protect the TQN message broker. That is, every time a TQN client attempts to use a service of the TQN message broker, the SP can determine whether or not the client's use request includes a valid authorization certificate. If it does, then the TQN client can access the services of the TQN message broker. If not, however, the TQN client is bounced back to the IdP where the client must authenticate against a chosen credentials database. Assuming the TQN client is authenticated, the IdP releases a certificate that the client can use to get through the SP and access the TQN message broker. In such a scenario, the SP does not know anything about the TQN client, except the fact that the client is actually authorized to access the TQN.

Figure 3:
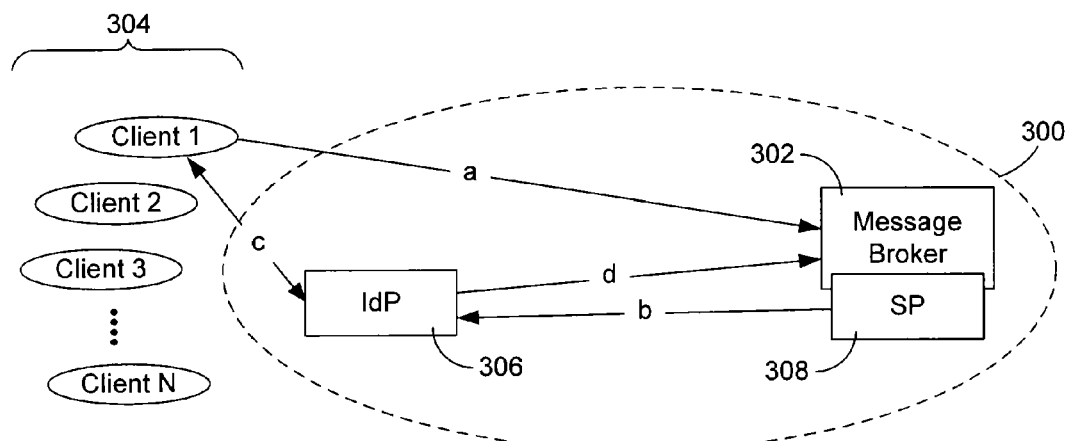
FIG. 3 is a schematic diagram that depicts an embodiment of TQN client authentication.

FIG. 3 illustrates the above-described functionality in a use example. In FIG. 3, a TQN message broker 302 is potentially accessible to multiple TQN clients 304 via a TQN network 300. When a TQN client 304 (Client 1) attempts to access the services of the TQN message broker 302 (path a), the SP 308 intercepts the request and determines whether or not Client 1 has been authenticated. If not, the SP sends the request to the IdP 306 (path b), which authenticates Client 1 (path c). Client 1 is then connected with the TQN message broker 302 (path d). This time, however, the SP 308 permits access because the request includes a certificate proving Client 1's authorization to use the TQN message broker 302.

Although an open source system such as Shibboleth® may be used to provide authentication, it is to be understood that such a system is not necessary to the operation or implementation of the disclosed TQNs. Indeed, substantially any system that provides authentication without requiring the client to divulge personal data can be used. Accordingly, the authentication that is implemented in a TQN can take many different forms. Example alternative authentication systems that can be used include: htaccess distributed configuration files, LDAP (Lightweight Directory Access Protocol), public key infrastructure certificates, smart cards, biometric systems, and one-time passwords.

TQN Message Broker

As expressed above, the role of the TQN message broker is that of enabling a P2P communication between the TQN clients without revealing each other's physical location in a data communications network, such as the Internet. In some embodiments, a TQN client registers with the TQN message broker when the client first authenticates and accesses the TQN message broker's services. Such registration can comprise the TQN client (node) identifying to the TQN message broker the client's physical location with an Internet protocol (IP) address or a universal resource locator (URL) to which TQN messages can be forwarded, as well as the client's encryption public key. From the TQN message broker side, the registering node is assigned a unique and random identifier, different each time the client registers, that is to be used on the TQN to univocally and anonymously identify the node over the TQN. That information can, for example, be stored in a node directory on the TQN message broker. The directory can comprise random identifiers and the public keys for each node, which are made available to all the nodes authenticated on the network. The physical location of the nodes, however, is strictly confidential and accessible only by the TQN message broker. In some embodiments, further security is provided in that the TQN message broker cannot anticipate an order of message processing because each TQN client may randomly select the next TQN client to which a message will be passed.

TQN Clients

TQN clients are the interface between the organizations and the TQN. They allow users to formulate queries and retrieve results through a graphical user interface. Each of the TQN clients is also able to perform, in way a transparent to the user, all of the functions required by the TQN protocol (described below) to implement the solution in a distributed coordination fashion. A TQN client is also the interface between the TQN and the policy and data stores present at the organization's sites. As mentioned above, those stores respectively contain the policy rules that are to be used to evaluate the participation of the organization to the different queries which are received and the private data to be used to respond to the TQN queries.

As is described below, when a TQN client receives a query during policy evaluation, the client checks whether or not the policy for that query contained in the policy store allows the client to participate. If so, the client pulls the answer to that query from the data store. The data store can contain the raw data for each query, or an interface to some other system that collects the required data.

TQN Messages

The communication between the clients/nodes happens through the use of TQN messages. A TQN message can comprise various fields, and the content of the message can vary according to which phase of the TQN protocol the message pertains. In some embodiments, a TQN message is originated by the node initiating a query (i.e., the intiator node), and the same message is used throughout the entire TQN protocol, being passed from node to node (responding nodes) until the query results are obtained and propagated to each of the nodes. Therefore, it can be said that the TQN message is the part of the process that provides a result to a query. Table 1 identifies and defines example fields for a typical TQN message.

TABLE 1

| Field | Description |
| --- | --- |
| Message Type | Indicates to which phase of the TQN Protocol the message belongs. It can be: Policy, Data, or Result. |
| Query ID | Indicates to which query the message is associated. |

TABLE 1-continued

| Field | Description |
| --- | --- |
| Message ID | Indicates a unique ID to identify this message during it paths across the nodes. A message can pass several times from the same node according to the protocol and it is important to know when it has already passed from a certain node to take the right actions. |
| Initiator Node | Indicates the unique random ID of the node that initiated the query. |
| Data | This field contains aggregating data and, at the end of the TQN Protocol, the result of the query. |
| Participant List | This list contains the list of nodes that agreed to participate to the query. |
| Next Round Participant List | According to the TQN Protocol, the message makes different rounds through the nodes. This list identifies to the next node which nodes are going to take part. |
| Visited Nodes List | List containing the nodes already visited during the current round of the TQN Protocol. It is reset at the end of each traveling round, when the message returns to the initiator (see TQN Message Protocol for more details). |

TQN Queries and Policy Rules

TQN queries are the set of questions on which participants have previously agreed or, in some embodiments, a new question that, should a participant agree to consider, will be added to the set of questions. The queries address various aspects related to the underlying topic that is the subject of the information sharing (e.g., information security and computer-based attacks). Since the end users are human beings, the queries can each include a unique identifier and a brief textual description of the meaning or purpose of the query. In some embodiments, the answers to the queries are purely quantitative. That is, the answers are numbers (e.g., the numbers of computer-based attacks on the organization over a particular period of time, the percentage of a budget spent on information security, etc.). In some embodiments, the queries may be such that a set of queries comprises a more complex query/sub-query set.

The policy rules define whether or not a TQN client is going to participate in a query. Different implementations of a TQN can have different kinds of policy rules. In some embodiments, an organization can decide, as to each query, whether it will: (i) always participate, (ii) never participate, or (iii) participate only if the total number of participants is greater than a numerical threshold defined by the organization.

Figure 4:
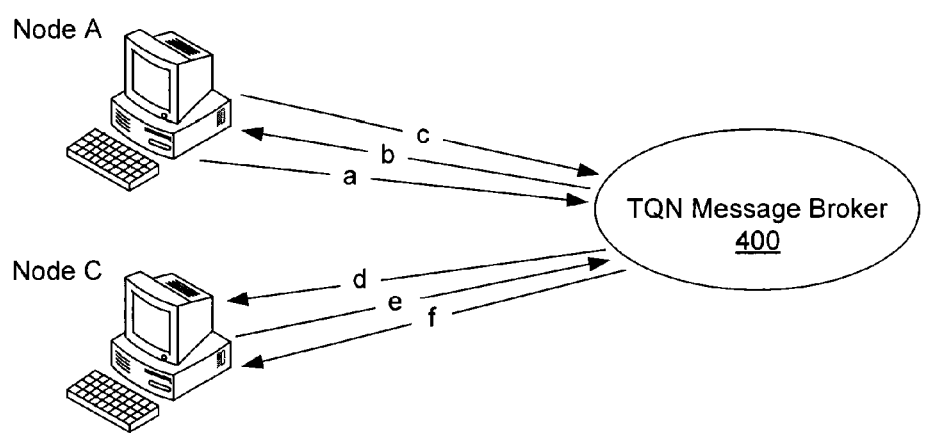
FIG. 4 is a schematic diagram that depicts an embodiment of communication between TQN clients.

Before discussing the TQN protocol in detail, it is worthwhile to explain how the different components of the TQN interact with each other. FIG. 4 illustrates a case in which one TQN client, at Node A, wishes to communicate with a further TQN client, at Node C. When Node A wishes to communicate with Node C, Node A first requests from the TQN message broker 400 (path a) and receives (path b) the public encryption key of Node C. Recall that each node's public key is provided to the TQN message broker by the node during the registration process. Node A can then create a TQN message to be sent to Node C. Once the message is created, it is signed by Node A with its own private key and then encrypted with Node C's public key so that only Node C can read the contents of the message. Node A then sends the message to the TQN message broker 400 (path c) with an indication that the message is to be forwarded to Node C.

The TQN message broker 400 receives the message, looks up the physical location of Node C, and, after signing the message with its own certificate, sends the message to Node C (path d) notifying Node C that the message is from Node A. At this point, Node C verifies the signature of the TQN message broker 400 and decrypts the message with its own private key. Next, Node C requests (path e) and receives (path f) from the TQN message broker 400 Node A's public key, and verifies Node A's signature on the sent message. If all of these operations are completed successfully, then the TQN message can be assumed to have travelled from Node A to Node C in a confidential manner and Node C can trust the message's origin. By design, the TQN message broker is very simple. In at least some embodiments, the TQN message broker is a stateless component that is unable to read the messages that it routes. In some embodiments, the TQN message broker cannot anticipate any sequential order of the messages being passed because each TQN client can choose to which next TQN client it will relay the message being processed.

In some embodiments, communications between any node and the TQN message broker are also encrypted. For example, assuming Node A wishes to send a message to the TQN message broker requesting Node C's public key, Node A creates the message, signs the message with its own private key, and then encrypts it with the TQN message broker's public key. The TQN message broker is the only entity that can decrypt the message and further the TQN broker can verify that the message came from Node A. The TQN message broker can then reply to Node A using a similar process. Specifically, the TQN message broker creates a message, signs the message with its private key, and encrypts the message with Node A's public key, so that Node A receives the content of the message (e.g., Node C's public key) securely.

TQN Message Protocol

The TQN message protocol is a key component of the TQN solution. In the discussion of the TQN message protocol that follows, descriptions of the operation of the TQN message broker and the encryption used for communications have been omitted for purposes of brevity. Accordingly, when it is stated, for example, that "Node A sends a message to Node C," the participation of the TQN message broker and the encryption performed is not explicitly identified but, in at least some embodiments, occurs in the same manner as that described above in relation to FIG. 4. It is also assumed for the following discussion that all TQN clients have already been authenticated and have registered with the TQN message broker.

In some embodiments, the TQN message protocol comprises the following steps:

Query initialization (message creation);

Policy evaluation rounds (first group of message rounds across the nodes);

Data rounds (second group of message rounds across the nodes);

Result propagation (message forwarding to all the participating nodes).

Each of those steps is described in the following paragraphs.

The initialization of a query is performed by a TQN client (i.e., the initiator node) at which a user wishes to start a new query. The new TQN message can, for example, comprise the fields and contents identified in Table 2.

TABLE 2

| Field | Value |
|---|---|
| Message Type | Set to "Policy". |
| Query ID | The unique ID indicating the desired Query. |
| Message ID | A random unique ID to identify this message. |
| Initiator Node | The Node ID of the node from which the Query is initiated. |
| Data | Empty. |
| Participant List | The list of all the nodes registered to the TQN Message Broker is retrieved and used to fill in this field. |
| Next Round Participant List | Empty. |
| Visited Nodes List | Empty. |

Once the new TQN message has been created, the initiator node is prepared to begin the policy evaluation rounds.

Policy Evaluation Rounds

In cases in which distributed coordination is used, each TQN client can evaluate its own policy against a given query. To enable this, the TQN message travels across the nodes in a "policy" modality (set in the "message type" field) in which each node's response in regard to willingness to participate relative to a particular query is collected.

As described above, the policy rules can be of two general types: absolute, meaning always or never participate, or quantitative, meaning that the participation depends upon the number of willing participants. Since the coordination is distributed, the existence of the quantitative policy rules makes the evaluation of nodes' participation relatively complex. Each TQN client is provided the opportunity to evaluate the most recent data regarding the query in terms of actual number of participants. For this reason, the policy evaluation rounds comprise a protocol that aims to pass a TQN message in the "policy" modality across the TQN clients until the number of participants converges to a particular number of participants. An example of how this can be achieved is described next.

In some embodiments, the policy evaluation rounds are comprised of 1+n rounds, with n>0 such that at least two policy evaluation rounds occur. The first round is a special one. When the initiator node creates a TQN message, the node retrieves a list of all the registered nodes from the TQN message broker and uses the list to fill the "participant list" field in the TQN message. The initiator node then chooses a random next node from the list and sends the message to that node, which communicates its willingness or unwillingness to participate in the message and forwards it on to a next node on the list chosen at random. This process of receiving, responding, and forwarding is repeated by each node until all of the nodes in the participant list have been visited, whereupon the message returns to the initiator node. In some cases, the first round evaluates only absolute ("always" or "never") policy rules, and quantitative rules are considered as a positive absolute rule (i.e., always). That is to say "count>X" is considered to mean "always" in the first policy evaluation round. When a node evaluating its policy rule determines that it might be a participant, it appends its node ID to the TQN message in the "next round participants list" field. When the first round is completed, the initiator node, before starting a new round, moves the list of nodes from the "next round participant list" field to the "participant list" field in the TQN message so that the message will only travel to the nodes that, at least at the moment, agreed to participate.

An example of the policy evaluation rounds is schematically depicted in FIGS. 5A-5D. In those figures, multiple nodes (Nodes A-D) are shown participating in multiple policy evaluation rounds, beginning with the first round in FIG. 5A. For purposes of this example, there are a total of three pre-defined queries, Query 1, Query 2, and Query 3. Each node's policy rule as to each query is shown below in Table 3.

TABLE 3

| Node | Query 1 | Query 2 | Query 3 |
| --- | --- | --- | --- |
| A | always | never | always |
| B | always | never | count >3 |
| C | always | never | count >4 |
| D | always | never | always |

By way of example, each query can pertain to a given information security question, such as "How many cyber attacks did your organization sustain in the previous year?" or "What percentage of your annual IT budget is spent on information security?" For the example of FIGS. 5A-5D, it is assumed that at issue is Query 3.

Figure 5A:
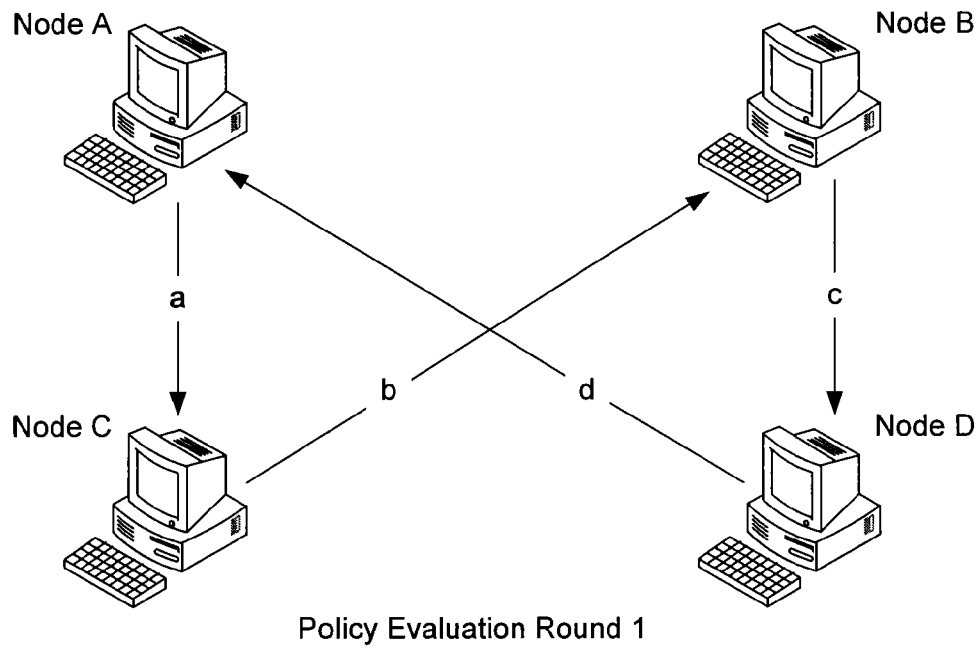
FIGS. 5A-5D are schematic diagrams that depict policy evaluation rounds performed by TQN clients relative to a particular query.

Beginning with the Round 1 and FIG. 5A, Node A, as the initiator node, sends Query 3, in the form of a TQN message, to Node C (path a). Node C receives the TQN message and evaluates its policy rules based upon the absolute participation or non-participation described above. Because Node C's policy rule is "count>4" for Query 3, Node C adds its node ID to the "next round participant list" field of the TQN message and forwards the message to the next node, in this example, Node B (path b). Node B receives the message, determines its policy rule, and, in this case, adds its node ID to the "next round participant list" field of the TQN message and forwards the message to the next node, in this example, Node D (path c). Node D performs the substantially the same processes performed by Nodes C and B but, being the last node in the TQN, sends the message back to the initiator node, Node A (path d).

It is noted that, in at least some embodiments, each path in the each round of the TQN protocol is randomized for security reasons such that each client decides which node will be the next node to which send the TQN message. This randomization is part of the distributed coordination protocol. In some embodiments, the path randomization algorithm for a single node works as follows:

When a node receives a TQN message, the message contains a list of participants and a list of already visited nodes for the present round;

The node reads the list of participants and removes from the list the nodes already visited;

From the remaining nodes, the node chooses a random next node ensuring not to choose a node chosen for one of the previous rounds for the TQN message; and If all the participant nodes have already been visited, the round is over and the message is returned to the initiator node.

In all successive rounds following Round 1, the policy evaluation also considers the quantitative rules, basing the count of the participants on the total number of potential participants at the end of the previous round. Using the example of FIG. 5A, the number of participants in the second round will be four, since four nodes were potential participants at the end of the first round. In the rounds following the first round, the message travels around all the nodes registered in the participant list. If a node evaluating its policy rule for a particular query decided that it will participate, it simply registers its name in the "next round participant list" field as well as in the "visited nodes list" field. No action is required to withdraw from the query participation.

Figure 5B:
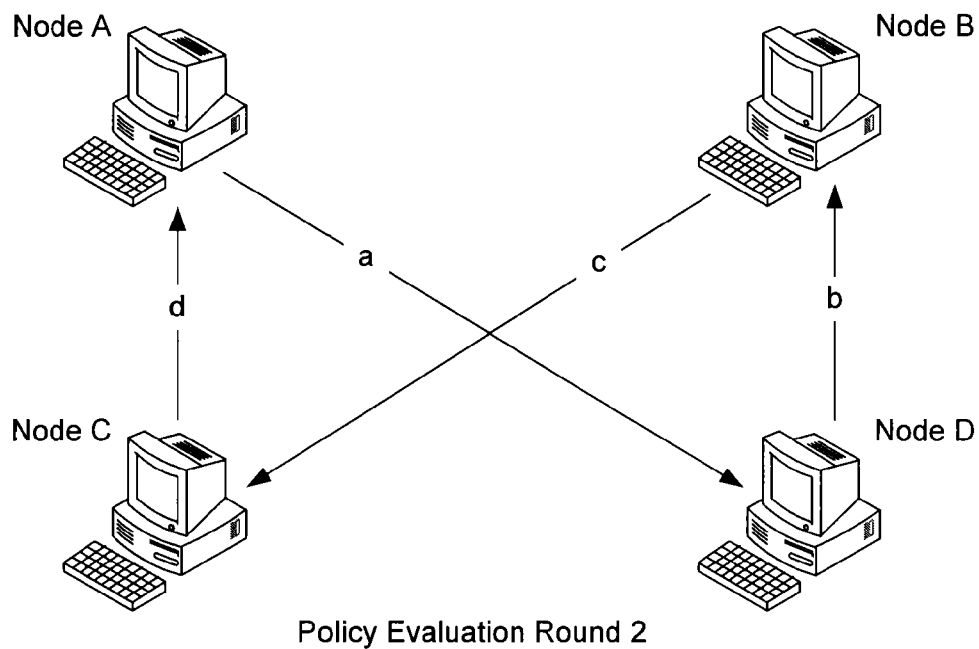
Figure 5C:
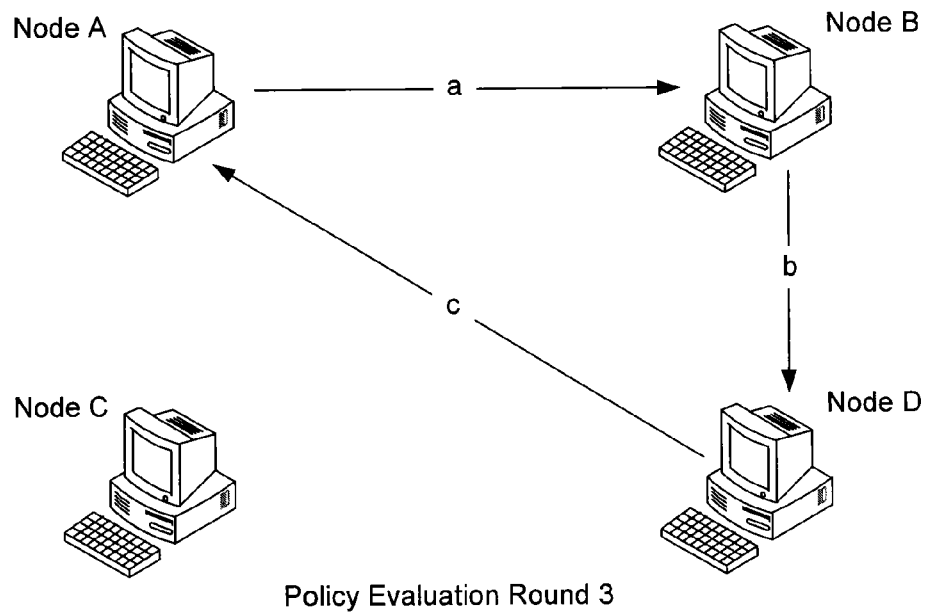
Figure 5D:
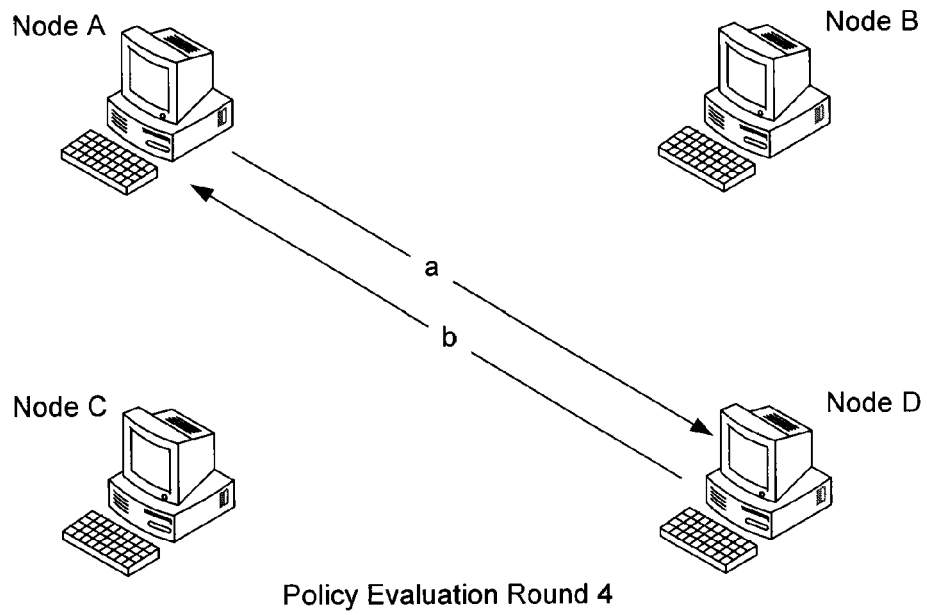

Successive policy evaluation rounds are depicted in FIGS. 5B-5D. In Round 2 shown in FIG. 5B, Node A sends the TQN message to Node D (path a), Node D forwards the message to Node B (path b), Node B forwards the message to Node C (path c), and Node C sends the message back again to Node A (path d), with each of the paths being selected at random except for the return path to Node A. In Round 2, Nodes A, D, and B agreed to participate because Node A's and D's policy regarding Query 3 is "always," and Node B's policy regarding Query 3 is "yes" if the participant count is greater than three (recall that the participant count at the end of Round 1 was four). Node C, however, withdrew because its policy regarding Query 3 is "yes" only if the participant count is greater than four, which it is not. This results in a total of three participants remaining in the policy evaluation, Nodes, A, B, and D.

Turning next to Round 3 and FIG. 5C, Node A sends the message to Node B (path a), Node B forwards the message to Node D (path b), and Node D returns the message to Node A (path c). In Round 3, Nodes A and D agreed to participate because their policy regarding Query 3 is "always," but Node B withdrew because its policy regarding Query 3 is "yes" only if the participant count is greater than three, which it is not. This results in a total of two participants remaining, Nodes A and D.

In the fourth and final round shown in FIG. 5D, Node A sends the message to Node D (path a), which later returns the message back to Node A (path b). In Round 4 Nodes A and D agree to participate because their policy regarding Query 3 is "always." Given that there are no more nodes to evaluate, the final participation count for Query 3 has converged to two. In some embodiments, the count is deemed to have converged and the policy evaluation terminates once the participant count is the same in two subsequent rounds. This implies that all of the nodes have had the chance to evaluate their policy rule against the final number of participants and no other node is willing to withdraw. If the number of participant nodes gets down to one, the query fails.

Data Rounds

Once the participating TQN clients have been determined, the initiator node begins the second phase of the TQN protocol, the data rounds. In this phase, the TQN message is placed in the "data" modality, as noted in the "message type" field. The message travels twice to each of the participants and returns, at the end of the second round, to the node initiator with the aggregated result for the query. This process is depicted in FIGS. 6A and 6B.

Figure 6A:
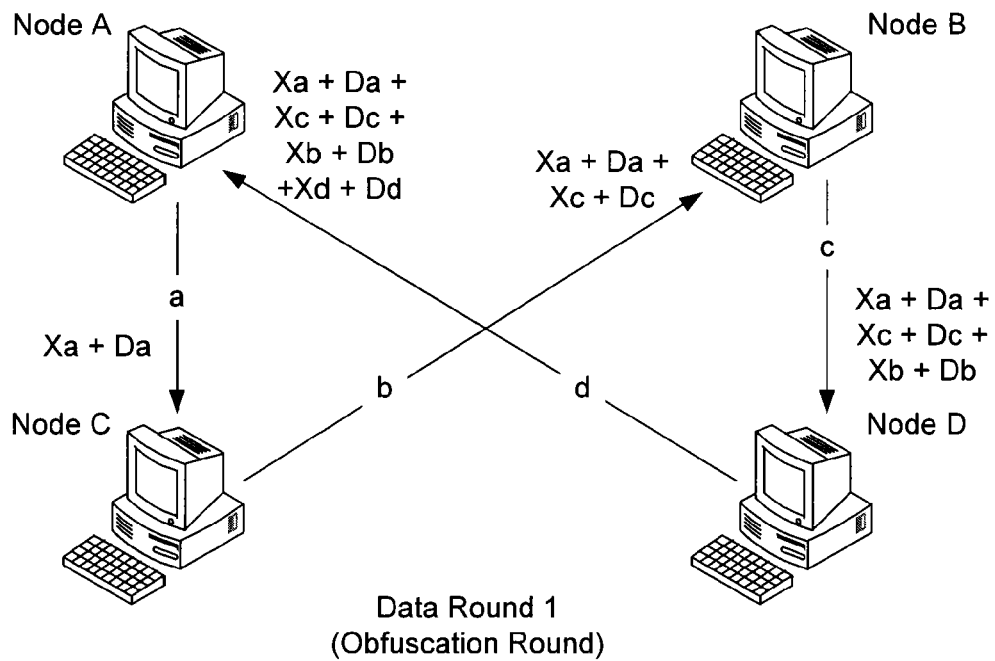
FIGS. 6A and 6B are schematic diagrams that depict data rounds performed by TQN clients relative to a particular query.

The first round of the data rounds can be referred to as the "obfuscation round," and is depicted in FIG. 6A. In that round, each participating node provides true data D (e.g., a number that is the answer to the question) as well as obfuscation data X (e.g., a further number) that aggregates as the message passes from node to node. As used herein, "obfuscation data" means false data that is added to the true data of the message to mask the true data. In some embodiments, when the true data is a number, the obfuscation data comprises a randomly generated number, which can be positive, negative, or null, that is mathematically added to the true data. As indicated in FIG. 6A, Node A begins the obfuscation round by adding true data Da and obfuscation data Xa to the message in the "data" field, and then sending the message to Node C (path a). Node C adds its own true data Dc and obfuscation data Xc and forwards the message to Node B (path b), which then comprises data Xa+Da+Xc+Dc. The process continues with Nodes B and D adding their true data and obfuscation data, and the message ultimately returns to Node A containing data Xa+Da+Xc+Dc+Xb+Db+Xd+Dd. In cases in which each piece of true data and each piece of obfuscation data is a number, Xa+Da+Xc+Dc+Xb+Db+Xd+Dd will also be a number.

Figure 6B:
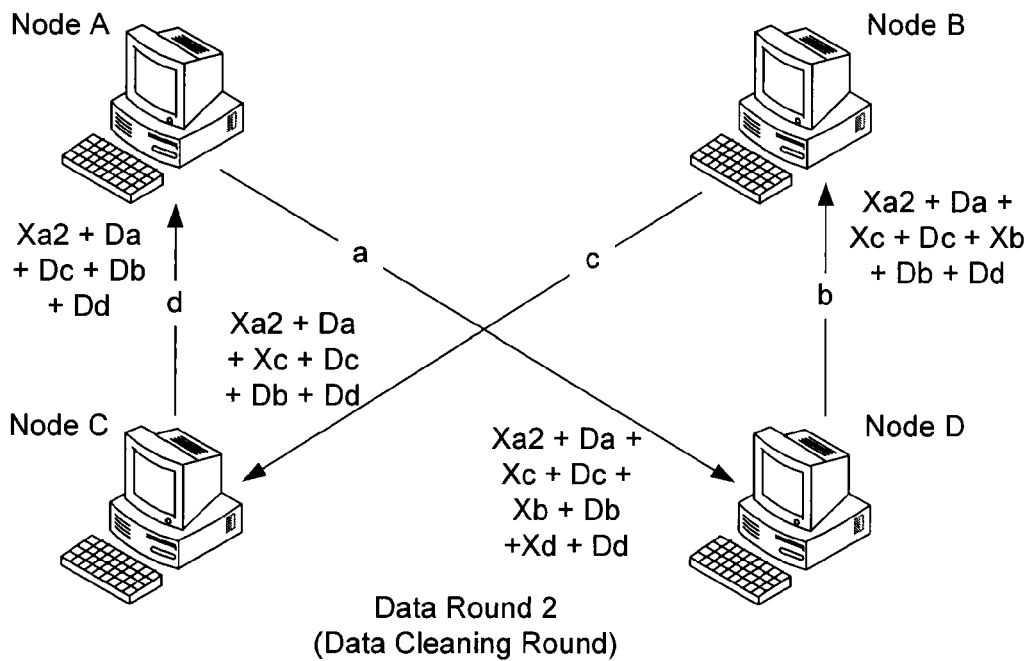

The second round can be referred to as the "data cleaning round," and is depicted in FIG. 6B. In this round, Node A changes its obfuscation (denoted Xa2) and sends the message to Node D (path a), the message containing data Xa2+Da+Xc+Dc+Xb+Db+Xd+Dd. After receiving the message, Node D removes the obfuscation data it added to the message in the obfuscation round and then forwards the message to the next node, in this example, Node B (path b). Similar obfuscation data removal is then performed by Node B and Node C and the message returns to Node A (path d) containing the data Xa2+Da+Dc+Db+Dd. At that point, Node A removes its own obfuscation data Xa2, and then broadcasts the query result to each node, which can, for example, comprise a summation of the true data. To do this, the initiator node changes the modality of TQN message to "result," and the message is sent to all the participants to the query. Assuming for purposes of demonstration that Da=5, Db=7, Dc=2, and Dd=11, the query result (provided in the form of a summation) would be 25, and the average response would be 6.25.

In the obfuscation and data cleaning rounds described above, the only field of the TQN message that was modified besides the "visited nodes list" field was the "data" field. In the obfuscation round, each of the participants provided its response to the query in the "data" field along with obfuscation data. Therefore, obfuscation is an action that each participating node performs to enforce the privacy of its own personal data. Using a distributed obfuscation, attacks from colluding nodes can be thwarted. For example, assume that two nodes, Nodes X1 and X2 wished to collude to obtain the personal data of a third victim node, Node V. Assume that during the first round Node V is between Node X1 and Node X2. That means Node X1 receives the TQN Message, adds its personal data and its obfuscation data, and passes the message to Node V, which will do the same and pass the message to Node X2. Nodes X1 and X2 then know what the sum of the data plus obfuscation is for Node V. To actually know Node V's personal data, Nodes X1 and X2 would need Node V to also be between Nodes X1 and X2 in the second round, which would reveal the obfuscation data that Node V used. Path randomization, however, makes this eventuality extremely unlikely (because a participant Node can set its own policy for the threshold number of participants required for its own participation, it can make path randomization extremely complex). Furthermore, even if Node X1 and X2 can deduce Node V's personal data, those nodes have no information about Node V's identity because the TQN clients are anonymous in the network. It is noted that, in some embodiments, the initiating node can be the only node to add obfuscation data to its real data, and other nodes can just add their data without individual obfuscation. One can consider this as a case of the above-described obfuscation, wherein a node may choose to add "0" (i.e., nothing) as obfuscation data.

Example Node Operation

Figure 7A:
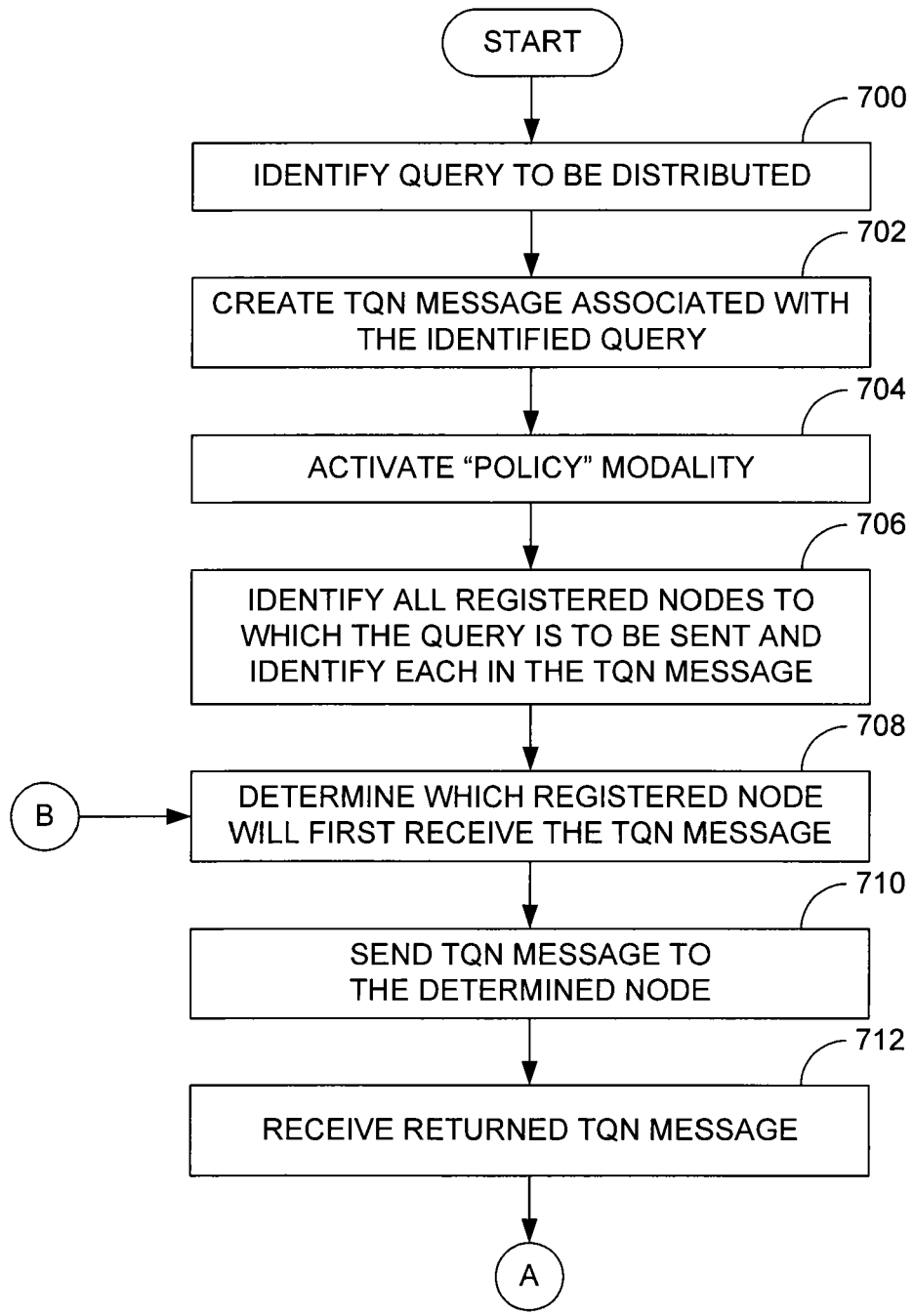
FIGS. 7A-7C comprise a flow diagram that illustrates an embodiment of operation of an initiator node in a TQN.
Figure 7B:
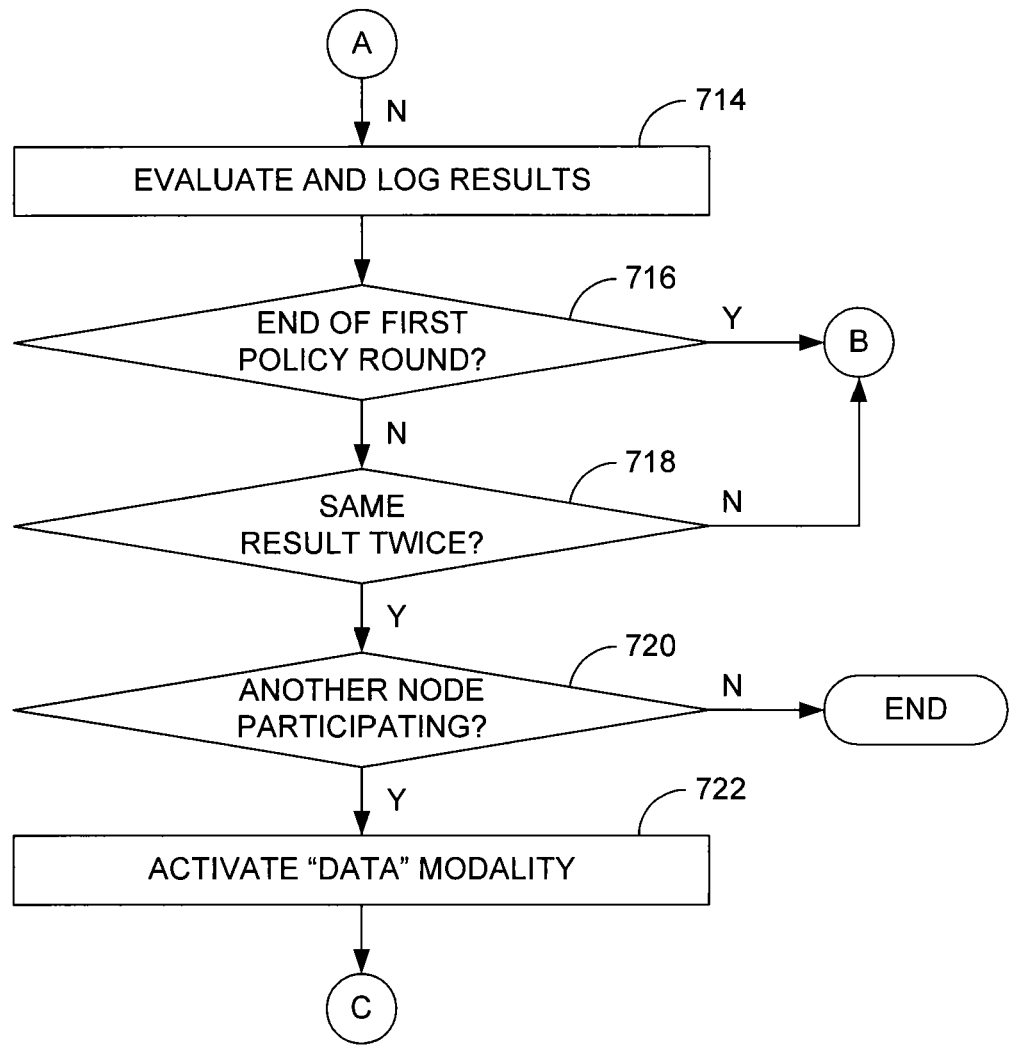
Figure 7C:
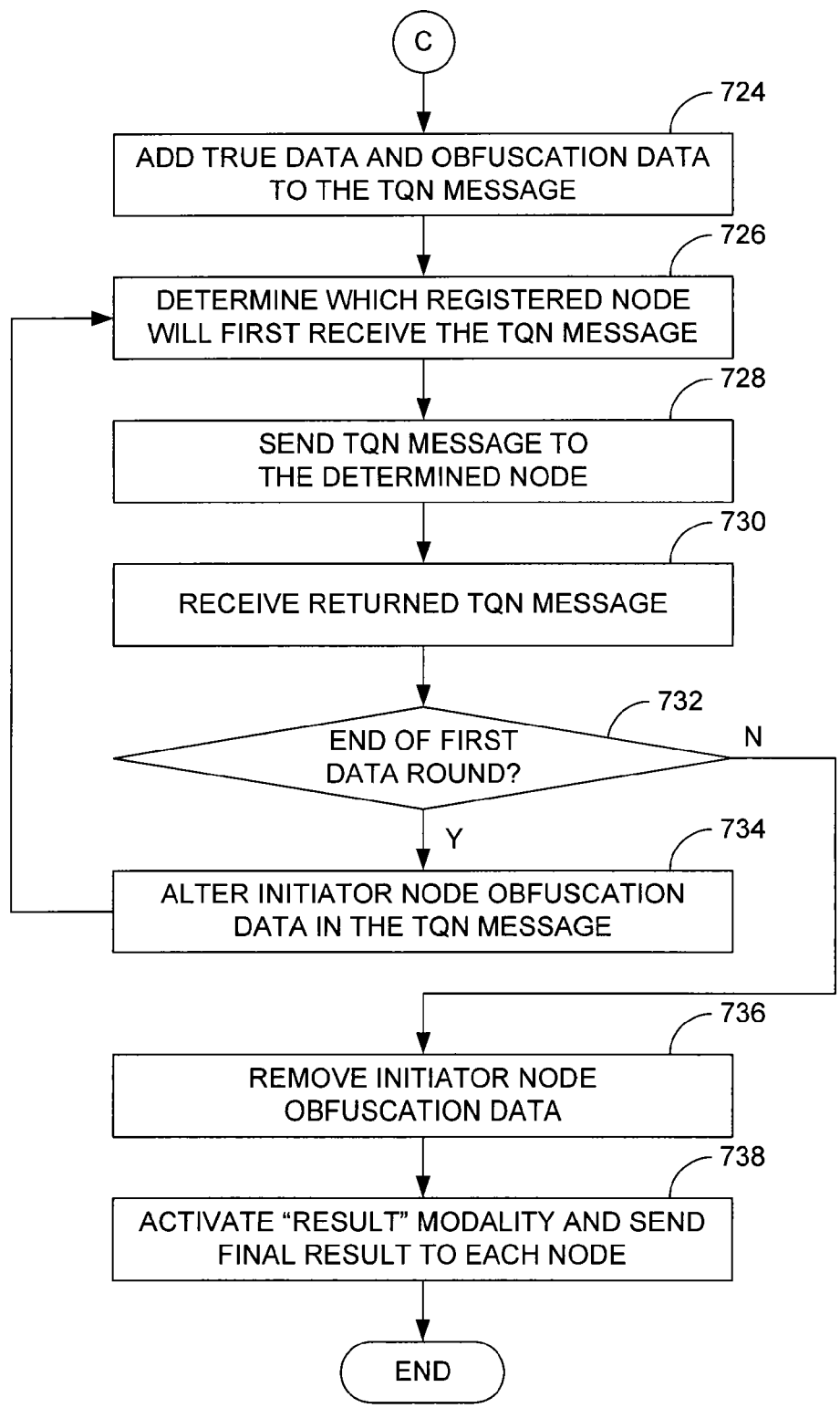

FIGS. 7A-7C and 8A-8D illustrate the TQN protocol described above from the perspective of the TQN clients. More particularly, FIGS. 7A-7C illustrate an example of operation of the initiator node during the policy and data rounds, while FIGS. 8A-8D illustrate an example of operation of the responding nodes (i.e., the other nodes in the TQN) during the policy and data rounds. In the discussions of those figures, process steps or blocks may represent modules, segments, or portions of code that include one or more executable instructions for implementing specific logical functions or steps in the process. Although particular example actions are described, alternative implementations are feasible. Moreover, actions may be executed out of order from that shown or discussed. As before, the operation of the TQN message broker is not described. It will be understood, however, that when it is stated that one node "sends" a message to another node, the message is actually routed through the TQN message broker as described above.

Beginning with block 700 of FIG. 7A, the initiator node identifies a query that is to be distributed to all of the registered TQN clients. In some embodiments, the query can be selected by a human user from a group of predefined queries that have been pre-approved by all of the clients. Once the query has been identified, the initiator node creates a TQN message associated with that query, as indicated in block 702. The message can, for example, contain each of the fields identified above in relation to Table 1. The initiator mode further activates the "policy" modality, as indicated in block 704, so that the responding nodes will be able to determine how to respond to receipt of the message. As described above, the "policy" modality can, for example, be activated and communicated by setting the "message type" field of the TQN message to "policy."

Next, with reference to block 706, the initiator node identifies all registered nodes to which the query is to be sent. As described above, the initiator node can, in some embodiments, retrieve a list of the registered nodes from the TQN message broker. As is further indicated in block 706, the initiator node identifies (anonymously) each of the registered nodes in the TQN message, for example by adding each node's node ID to the "participant list" field of the message. At this point, the initiator node can determine which registered node will first receive the TQN message, as indicated in block 708. The initiator node can, as can each node in the TQN, randomly chose the node to which to send the message from the list of possible nodes. Once the node has been determined, the initiator node sends the TQN message to that node, as indicated in block 710.

FIGS. 8A-8D illustrate an example of operation of a responding node upon receiving a TQN message, regardless of the node's order in the distribution of the TQN message or whether the message is received during the policy or data rounds. Beginning with block 800 of FIG. 8A, the responding node receives the TQN message and determines its modality. With reference to decision block 802, if the modality is the "policy" modality (which will be assumed at this point), flow continues to block 804 at which the query to which the TQN message pertains is identified. In addition, the responding node determines its own policy rule (i.e., the TQN client's policy rule) for that particular query, as indicated in block 806.

Figure 8A:
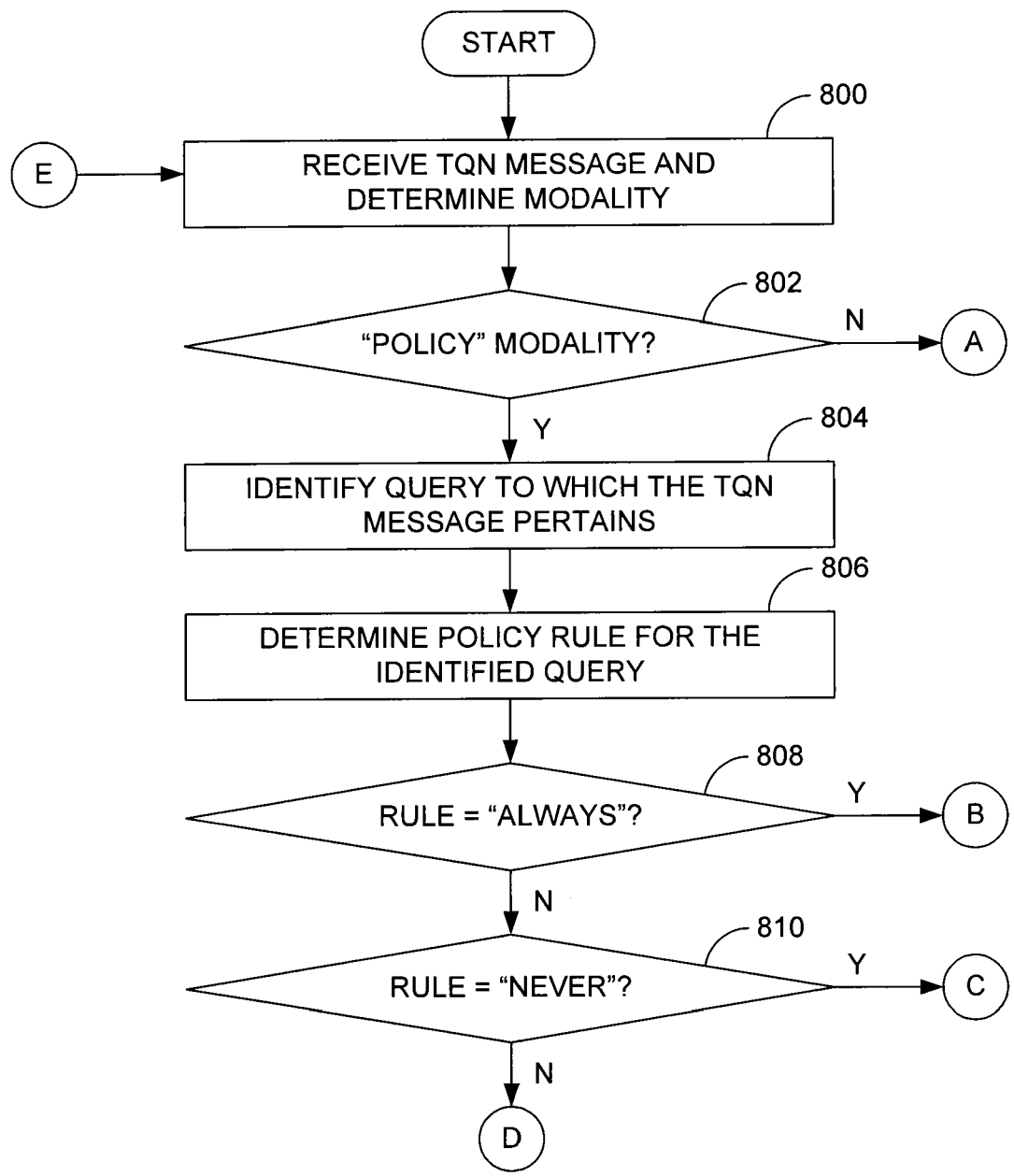
FIGS. 8A-8D comprise a flow diagram that illustrates an embodiment of operation of a responding node in a TQN.
Figure 8B:
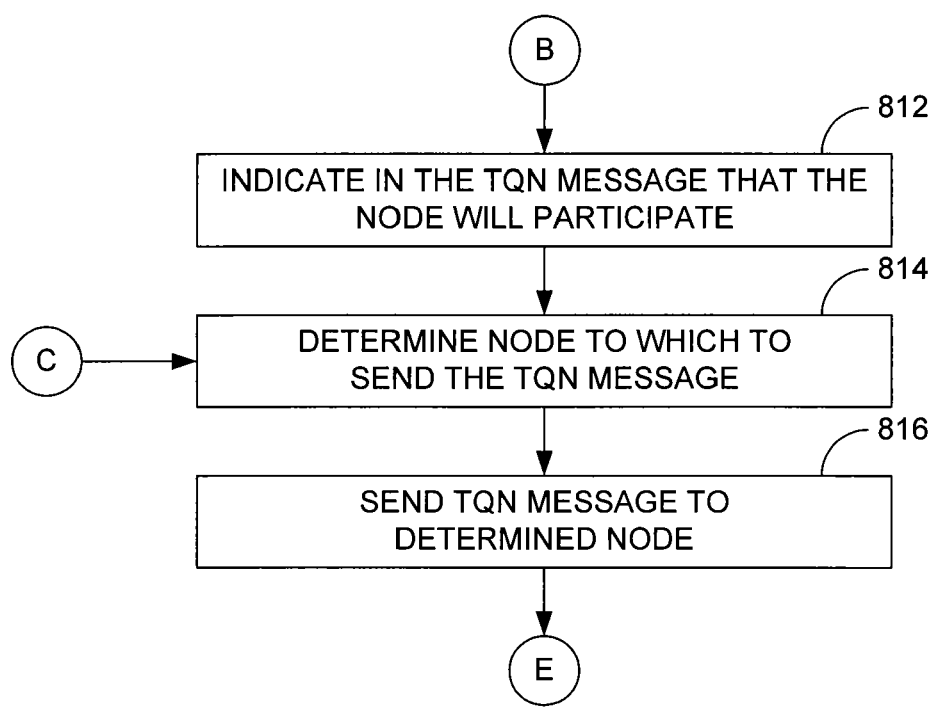

Referring to decision block 808, if the policy rule for the query at issue is "always," flow continues to block 812 of FIG. 8B at which the responding node indicates in the TQN message that it will participate in the query. As described above, a willingness to participate can be communicated by the responding node adding its node ID to the "next round participant list" field of the TQN message. Once the responding node has appropriately modified the TQN message, the node can then determine to which node to which to send the message next (block 814) and send the message to that node (block 816). Notably, if the responding node is the last of the responding nodes to receive the TQN message in the round, the responding node sends the message back to the initiator node.

With reference back to decision block 808 of FIG. 8A, if the responding node's policy rule is not "always," flow continues to decision block 810 from which flow depends upon whether or not policy rule is "never." If so, the responding node will not indicate in the TQN message that it will participate in the query, and flow proceeds directly to block 814 of FIG. 8B described above. Therefore, the responding node simply forwards the TQN message on to the next node (block 816).

Returning to decision block 810 of FIG. 8A, if the responding node's policy rule is neither "always" nor "never," the policy rule is dependent upon the participation of the other registered nodes. For example, the responding node may determine whether or not it will participate based upon whether or not a particular threshold number of registered nodes have indicated that they will participate. In such a case, flow continues on to decision block 818 of FIG. 8C at which it is determined whether or not it is the first policy evaluation round. If so (assumed for now), the responding node will respond as if it indeed will participate. Therefore, the responding node indicates in the TQN message that it will participate (block 820), determines which node to send the message to next (block 822), and sends the message to that node (block 824).

Once a responding node has responded, operation for the node is complete for the time being and the node can await return of the TQN message (or arrival of a new TQN message).

Assuming each responding node has responded in the first policy evaluation round, the TQN message returns to the initiator node, as indicated in block 712 of FIG. 7A. Referring next to block 714 of FIG. 7B, the results, in terms of affirmative indications that a node will participate in the query, are evaluated and logged. Then, in decision block 716, it is determined whether or not the process is at the end of the first policy evaluation round, meaning that each responding node has only received and forwarded the TQN message a single time during the policy evaluation rounds. If so, at least one further policy evaluation round is required and flow returns to block 708 of FIG. 7A at which the initiator node determines to which node to send the TQN message, and the initiator node again sends the message out (block 710). Assuming this to be the case, a responding node receives the TQN message, as indicated in block 800 of FIG. 8A. At decision block 802, the modality is again determined to be "policy," and flow continues in similar manner to that described above.

Figure 8C:
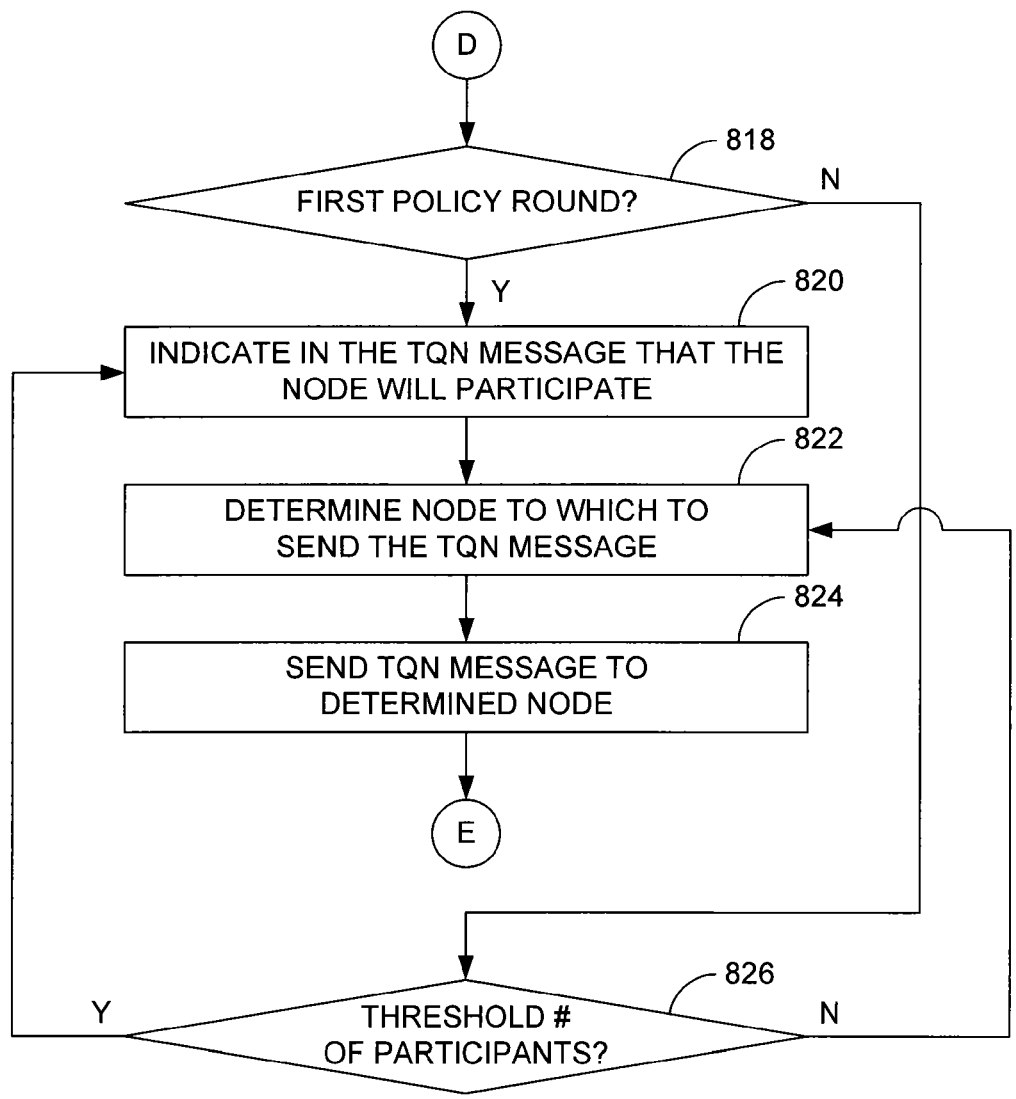
Figure 8D:
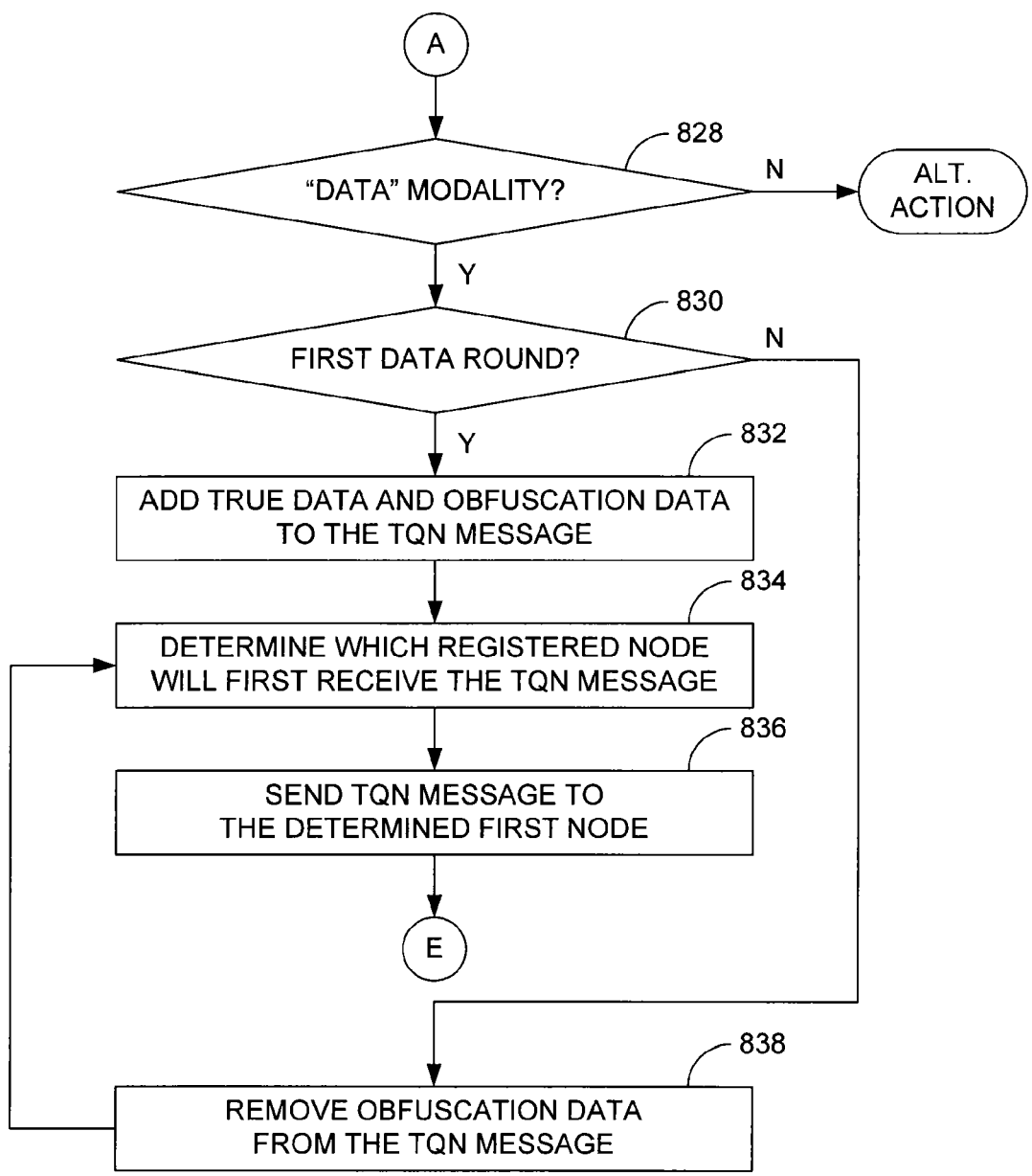

Because it is not the first of the policy evaluation rounds, operation of the responding node is different this time if the policy rule for the query is not "always" or "never." Therefore, as indicated in decision block 818 of FIG. 8C, if it is not the first policy evaluation round, flow continues to decision block 826 at which it is determined whether or not the threshold number of participants has been reached. If so, flow returns to block 820 and the responding node indicates in the TQN message that it will participate. The node then determines which node to send the message to (block 822) and sends the message to that node (block 824). If not, however, the responding node forwards the TQN message without indicating that it will participate.

Assuming that each responding node has responded in the subsequent policy evaluation round, the TQN message again returns to the initiator node (block 712 of FIG. 7A) and flow again proceeds to block 714 of FIG. 7B at which the results are evaluated and logged. Next, at decision block 716, it is again determined whether or not it is the end of the first policy evaluation round. Because it is not the end of the first policy evaluation round this time (i.e., it is the end of a subsequent round), flow continues to decision block 718, at which it is determined whether or not the same result, in terms the number of nodes participating, has been the same in two consecutive policy evaluation rounds, thereby indicating convergence of the results. If not, a further policy evaluation round is required and flow again returns to block 708 of FIG. 7A. Assuming the results have converged, however, flow proceeds to block 720 where the initiator node determines whether or not there is at least one other participating node (i.e., besides the initiator node). If not, there is no data available from the other nodes and the process, in terms of the query at issue, is terminated.

If there is at least one other participating node, however, the query can proceed. Therefore, as indicated in block 722, the initiator node activates the "data" modality. As described above, the "data" modality can, for example, be activated by setting the "message type" field of the TQN message to "data." Referring next to block 724 of FIG. 7C, the initiator node adds its true data and obfuscation data to the TQN message. As described above, both of these pieces of data can comprise numbers. In some embodiments, the true number may be combined with several obfuscation numbers and added to the "data" field. In some embodiments, the true number(s) and obfuscation number(s) are added together, and then the sum is added to the "data" field. For example, if the "data" field currently contains the number "12" (i.e., before the node adds its own data to the message), the node's true data is 7, and the node's obfuscation data is 4, the node can replace the "12" in the "data" field with "23." The initiator node can then determine which registered node that will first receive the TQN message (block 726) and send the message to that node (block 728).

Referring again to block 800 of FIG. 8A, a responding node receives the TQN message and determines its modality. With reference to decision block 802, this time the modality is not the "policy" modality, so flow proceeds to decision block 828 of FIG. 8D, from which flow depends upon whether or not the modality is the "data" modality. If not, alternative action(s) beyond the scope of the flow diagram can be performed. For example, if the modality was determined to be the "result" modality, the result contained in the TQN message can be stored by the responding node. Assuming, however, that it is a data round, flow continues to decision block 830 at which it is determined whether or not it is the first data round. If it is the first data round, the responding node adds its own true data and obfuscation data to the total in the "data" field of the TQN message, as indicated in block 832. Once the responding node has added its data to the TQN message, the node can then determine which node to send the message to (block 834) and send the message to that node (block 836).

Assuming that each responding node has responded in the first data round, the TQN message returns to the initiator node at block 730 of FIG. 7C and flow continues to decision block 732 at which it is determined whether or not it is the end of the first data round (i.e., the obfuscation round). If so, a second round (i.e., the data cleaning round) is still required and flow continues to block 734 at which the initiator node alters its obfuscation data in the TQN message by subtracting its previous obfuscation data from the count in the "data" field and, in some embodiments, adding a new, different obfuscation data to that count. The initiator node can then determine which registered node then will receive the TQN message (block 726) and send the message to that node (block 728).

Returning once again to block 800 of FIG. 8A, the responding node receives the TQN message and determines the modality. Assuming at decision block 802 that the modality is not "policy," flow continues again to decision block 828.

Assuming the "data" modality, flow continues again to decision block 830. Assuming this time that it is the second data round, flow continues down to block 838, at which the responding node removes its obfuscation data from the TQN message by subtracting it from the total in the "data" field. For example, if the "data" filed currently contained the number 50 and the obfuscation data the node had added was 4, the node can replace the "50" in the "data filed" with "46." Once the responding node has removed its obfuscation data, it can then determine which node to send the message to (block 834) and send the message to that node (block 836).

Returning one more time to FIG. 7C, the initiator node receives the TQN message after all responding nodes have acted in the second data round, as indicated in block 730. This time, it is not the end of the first data round, so flow proceeds from decision block 732 to block 736 at which the initiator node removes its own obfuscation data to reveal the final result of the query (e.g., a number). The initiator node can then activate the "result" modality and send the final result to each or each participating node, as indicated in block 738.

As can be appreciated from the above discussion, the TQN operates in a manner in which several goals are achieved. First, complete anonymity is provided through the use of independent authentication infrastructure, the screening role of the TQN message broker, and the concealing of the physical locations of the TQN clients. In addition, aggregated data disclosure is provided by the data rounds. Furthermore, distributed coordination is provided given that the TQN protocol comprises a series of small decisions taken by the individual TQN clients. Specifically, although the initiator node for each TQN query performs much of the work, each TQN client plays a role in determining the TQN message path.

A secure network is also provided by the several layers of encryption in the communications between the TQN clients and the TQN message broker. Additionally, opted participation is achieved because the TQN policy rules provide each organization with a means to decide when and how to take part to the different queries coming from the TQN. Also, automated operability is provided given that the TQN does not require human intervention once a query has been selected. Finally, the TQN is scalable at least in part due to the federative approach of the authentication system.

Example System

Figure 9:
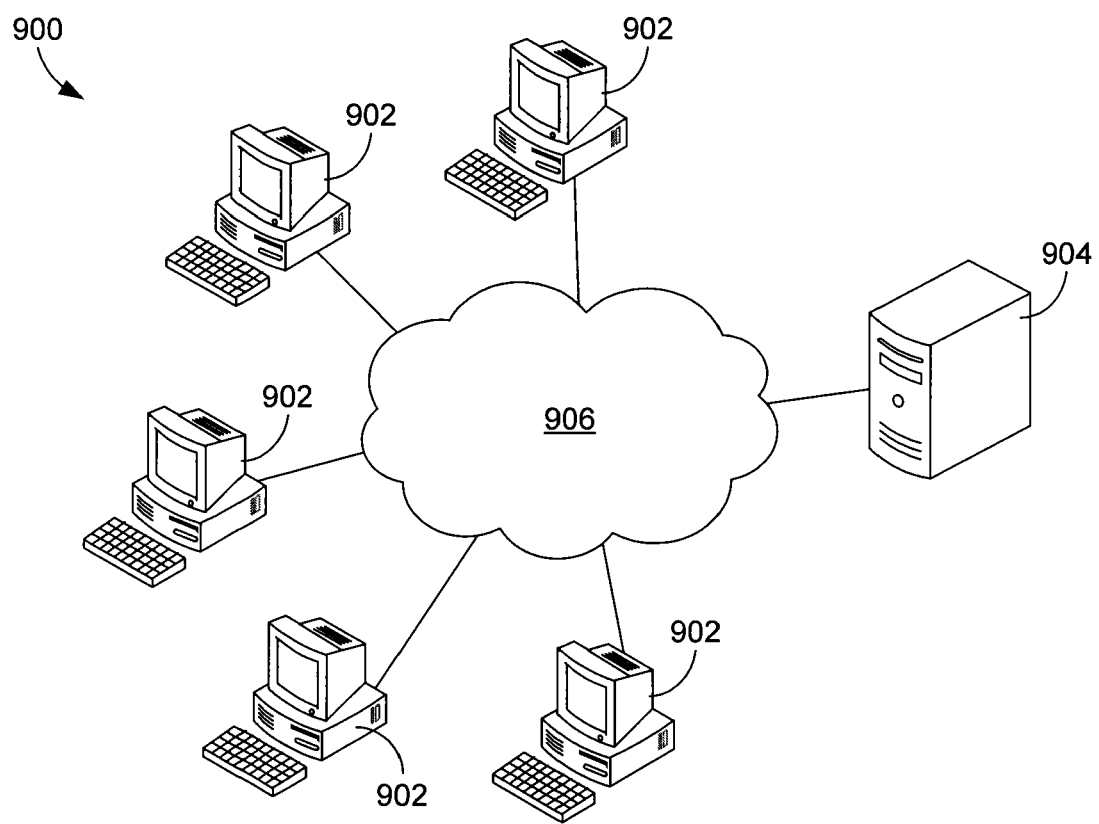
FIG. 9 is a schematic diagram that illustrates an embodiment of a system that can support a TQN.

FIG. 9 illustrates an example system 900 with which a TQN can be supported. As indicated in that figure, the system 900 generally comprises multiple client computers 902 and a server computer 904 that can communicate with each other via a network 906. The client computers 902 function as the TQN clients or nodes. In the embodiment of FIG. 9, each client computer 902 comprises a personal computer (PC). Although PCs are illustrated in FIG. 9 by way of example, it will be appreciated that substantially any network-enabled device with sufficient computing power could be used. For example, one or more of the client computers could comprise notebook or server computers. The server computer 904 functions as the TQN message broker. Although that functionality is shown as being performed by a server, it will be appreciated that the functionality could also be performed by another form of computing device.

The network 906 can comprise a single network, such as a local area network (LAN), or may comprise a collection of networks (LANs and/or wide area networks (WANs)) that are communicatively coupled to each other. In some embodiments, the network 906 may comprise part of the Internet.

Figure 10:
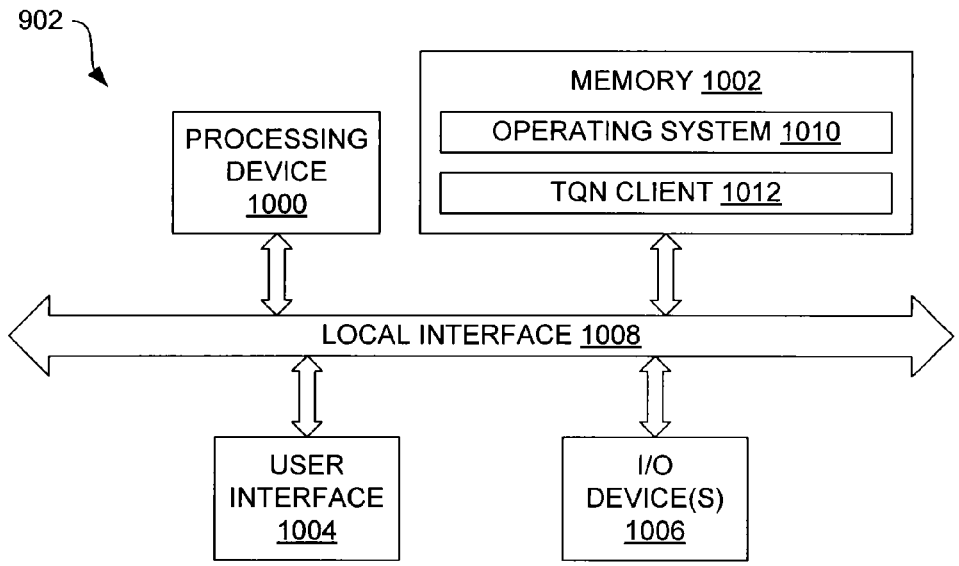
FIG. 10 is a block diagram that illustrates an embodiment of the architecture of a client computer shown in FIG. 9.

FIG. 10 is a block diagram illustrating an example architecture for one of the client computers 902 shown in FIG. 9. The computer 902 of FIG. 10 comprises a processing device 1000, memory 1002, a user interface 1004, and at least one I/O device 1006, each of which is connected to a local interface 1008.

The processing device 1000 can include a central processing unit (CPU) or a semiconductor-based microprocessor. The memory 1002 includes any one of or a combination of volatile memory elements (e.g., RAM) and nonvolatile memory elements (e.g., hard disk, ROM, tape, etc.).

The user interface 1004 comprises the components with which a user interacts with the computer 902. The user interface 1004 can comprise, for example, a keyboard, mouse, and a display, such as a cathode ray tube (CRT) or liquid crystal display (LCD) monitor. The one or more I/O devices 1006 are adapted to facilitate communications with other devices and can include one or more communication components such as a modulator/demodulator (e.g., modem), wireless (e.g., radio frequency (RF)) transceiver, network card, etc.

The memory 1002 comprises various software including an operating system 1010 and the TQN client 1012. The operating system 1010 controls the execution of programs and provides scheduling, input-output control, file and data management, memory management, and communication control and related services. The function and operation of the TQN client 1012 has been described in detail above.

Figure 11:
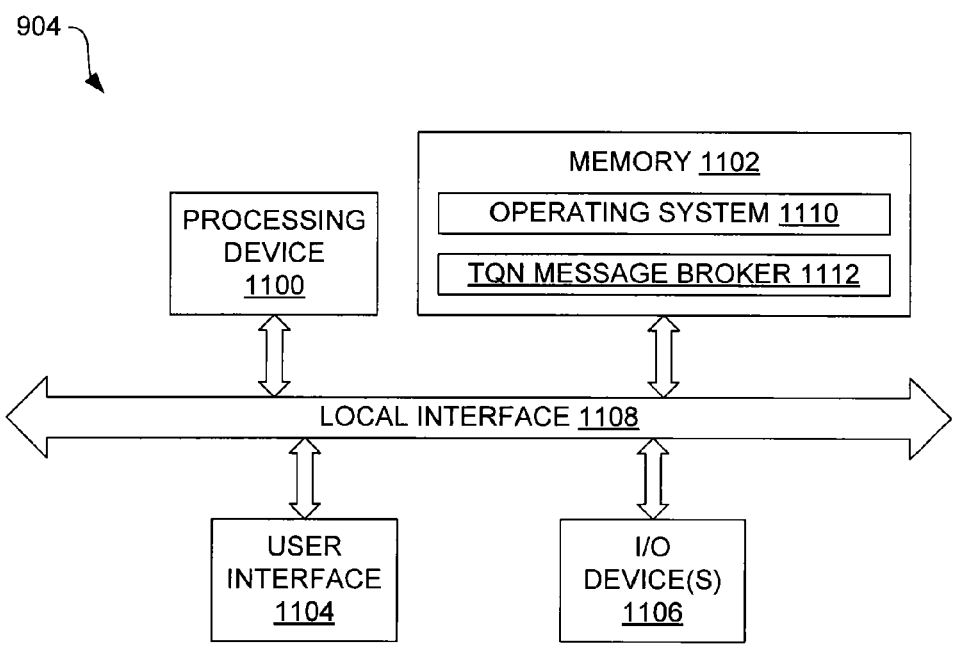
FIG. 11 is a block diagram illustrating an embodiment of the architecture of a server computer shown in FIG. 9.

FIG. 11 is a block diagram illustrating an example architecture for the server computer 904 shown in FIG. 9. As indicated in FIG. 11, the server computer 904 comprises many of the same components as the client computer 902 shown in FIG. 10, including a processing device 1100, memory 1102, a user interface 1104, and at least one I/O device 1106, each of which is connected to a local interface 1108. In some embodiments, those components have the same or similar construction and/or function of like-named components described above in relation to FIG. 10. Accordingly, a detailed discussion of the components of FIG. 11 is not presented herein.

As indicated in FIG. 11, the memory 1102 of the server computer 904 comprises an operating system 1110 and a TQN message broker 1112. The operating system 1110 controls the execution of programs and provides scheduling, input-output control, file and data management, memory management, and communication control and related services. The function and operation of the TQN message broker 1112 has been described in detail above.

Various logic has been described in the present disclosure. That logic can take the form of software code and/or programs that can be stored on any computer-readable medium for use by or in connection with a computer or computer-related system. In the context of this document, a "computer-readable medium" includes any electronic, magnetic, optical, or other physical device that can store instructions for execution by the computer or computer-related system.

Alternative Embodiments

Particular embodiments of systems and methods have been described herein. It is noted again that those embodiments are mere example implementations of the disclosed systems and methods. Therefore, other embodiments are possible and are considered to fall within the scope of the present disclosure. Features of some of those other embodiments are described below.

Although the set of possible queries can be predefined and fixed as in the above-described embodiments, in an alternative embodiment a participant can propose a query to the other participants for them to evaluate. The entire network can then decide if the query is to be added to the set. Such an embodiment may require the human participation at the client side, since a human being evaluates the query and eventually prepares the system to answer to that query.

In a further embodiment, the policy rules can be extended, making them more fine grained and not only absolute or quantitative. Consider a banking industry scenario as an example. Assume a given country has five large national banks and one hundred smaller regional banks. The IT managers of a large bank may be uncomfortable with sharing the bank's private data if the other large banks do not participate because the one large bank's data could alter the balance of the final result if no other large banks participate. In such a case, a policy rule could provide: "Participate only if three other national banks participate". Such functionality would mean that the network would have some specific information about the participants (i.e., national or regional).

In yet another embodiment, the TQN can include a business intelligence engine that records information about the queries. Such data could provide insight about some interesting aspects of the industry and how the industry deals with the underlying issue (e.g., information security).

In a further embodiment, the TQN can be implemented without a centralized component such as the TQN message broker.

The following are claimed:

1. A method for collecting a response to a query from nodes of a network, the method comprising:
    an initiating node determining its true response to the query, the true response being a number, adding an obfuscation number to its true response to generate a resulting number that conceals the value of its true response, entering in a data field of the message the resulting number, and then initiating a first data round by sending the message to one of the nodes;
    each node in the network other than the initiating node receiving the message, determining its own true response to the query, the true response also being a number, adding an obfuscation number to its true response to generate a resulting number that conceals the value of its true response, updating the data field of the message by adding the resulting number to the value contained in the data field, and sending the message to another node;
    the initiating node receiving the message after each other node has updated the data field of the message and initiating a second data round by resending the message to one of the nodes;
    each node in the network other than the initiating node receiving the message, subtracting its obfuscation number from the value contained in the data field of the message, and sending the message to another node; and
    the initiating node again receiving the message after each other node has subtracted its obfuscation number from the value contained in the data field of the message, subtracting the initiating node's obfuscation number from the value contained in the data field of the message, and identifying the result of the subtraction as the final result of the query.

2. The method of claim 1, further comprising the initiating node retrieving a list of nodes prior to sending the message in the first data round, wherein the list identifies each node by a node ID that does not reveal the identity or network location of the node.

3. The method of claim 2, further comprising the initiating node randomly selecting a node ID from the list as the node to which to send the message.

4. The method of claim 3, wherein the initiating node sending the message to one of the nodes comprises the initiating node sending the message to a message broker independent of all of the nodes that will route the message to the selected node, wherein only the message broker knows the network locations of the nodes and uses the selected node ID to look up the network location of the selected node.

5. The method of claim 1, wherein each node other than the initiating node sending the message to another node comprises identifying a list of node IDs in the message, selecting one of the node IDs at random, and sending the message to a message broker independent of all of the nodes that will route the message to the selected node, wherein only the message broker knows the network locations of the nodes and uses the selected node ID to look up the network location of the selected node.

6. The method of claim 1, further comprising, prior to any node sending a message to another node in the network, each node registering with an independent message broker.

7. The method of claim 6, wherein registering comprises authenticating each node.

8. The method of claim 1, wherein each node encrypts the message before sending it to another node.

9. The method of claim 1, further comprising the initiating node sending the final result to each node.

10. A trusted query network comprising:
    multiple clients, each client being configured to:
        receive a message identifying a query to be answered, the query being a question whose answer is a number,
        during a first data round, determine its true response to the query, add to a value contained in a data field of the message a number that is the sum of its true response to the query and an obfuscation number, the obfuscation number concealing the value of the true response, and
        during a second data round, subtract its obfuscation number from the value contained in the data field of the message.

11. The trusted query network of claim 10, each client further being configured to receive messages created by other clients, to determine whether or not the client will participate in a query initiated by another client, to indicate in the message the client's willingness to participate in the query, and to forward the message on to another client.

12. The trusted query network of claim 10, each client further being configured to retrieve a list of clients prior to sending a message it created, the list identifying each client by a node ID that does not reveal the identity or network location of the node.

13. The trusted query network of claim 10, further comprising a message broker independent from each of the clients, the message broker being configured to receive messages sent by the clients and intended for other clients and route the messages to the intended clients.

14. The method of claim 13, wherein only the message broker knows the network locations of the clients and uses the selected node ID to look up the network location of the selected client.

15. The trusted query network of claim 10, each client further being configured to randomly select another client to which to send or forward a message.

16. The trusted query network of claim 10, each client being configured to participate in a given query always, never, or only if a certain number of other clients participate.

17. The trusted query network of claim 10, each client further being configured to encrypt a message before sending or forwarding it to another node.

18. The trusted query network of claim 10, further comprising an authentication system that authenticates each client before the client can send a message to another client.

19. The trusted query network of claim 10, wherein each client is further configured to initiate the query by creating the message identifying the query to be answered by participating clients and distributing the message the other nodes.

20. A trusted query network comprising:
multiple clients, each client being configured to:
receive a message identifying a query to be answered, the query being a question whose answer is a number,
during a first data round, determine its true response to the query, add to a value contained in a data field of the message a number that is the sum of its true response to the query and an obfuscation number, the obfuscation number concealing the value of the true response, and
during a second data round, subtract its obfuscation number from the value contained in the data field of the message; and
a message broker independent from each of the clients, the message broker being configured to receive messages sent by the clients and intended for other clients and route the messages to the intended clients.

21. The trusted query network of claim 20, each client further being configured to receive messages created by other clients, to determine whether or not the client will participate in a query initiated by another client, to indicate in the message the client's willingness to participate in the query, and to forward the message on to another client.

22. The trusted query network of claim 20, each client further being configured to retrieve a list of clients prior to sending a message it created, the list identifying each client by a node ID that does not reveal the identity or network location of the node.

23. The method of claim 22, wherein only the message broker knows the network locations of the clients and uses the selected node ID to look up the network location of the selected client.

24. The trusted query network of claim 20, each client further being configured to randomly select another client to which to send or forward a message.

25. The trusted query network of claim 20, each client being configured to participate in a given query always, never, or only if a certain number of other clients participate.

26. The trusted query network of claim 20, each client further being configured to encrypt a message before sending or forwarding it to another node.

27. The trusted query network of claim 20, further comprising an authentication system that authenticates each client before the client can send a message to another client.

28. The trusted query network of claim 20, wherein each client is further configured to initiate the query by creating the message identifying the query to be answered by participating clients and distributing the message the other nodes.

* * * * *